(12) United States Patent
Deo et al.

(10) Patent No.: US 9,074,486 B2
(45) Date of Patent: *Jul. 7, 2015

(54) METHOD AND APPARATUS FOR LABYRINTH SEAL PACKING RING

(75) Inventors: Hrishikesh Vishvas Deo, Saratoga Springs, NY (US); Binayak Roy, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/018,080

(22) Filed: Jan. 31, 2011

(65) Prior Publication Data

US 2012/0193875 A1    Aug. 2, 2012

(51) Int. Cl.
| | |
|---|---|
| F16J 15/447 | (2006.01) |
| F16J 15/44 | (2006.01) |
| F01D 11/02 | (2006.01) |
| F01D 11/00 | (2006.01) |

(52) U.S. Cl.
CPC ......... *F01D 11/003* (2013.01); *Y10T 29/49826* (2015.01); *F01D 11/025* (2013.01); *F16J 15/4472* (2013.01); *F01D 11/02* (2013.01); *F16J 15/445* (2013.01); *F05D 2240/55* (2013.01)

(58) Field of Classification Search
CPC ......... F16J 15/44; F16J 15/441; F16J 15/442; F16J 15/445; F16J 15/447; F16J 15/4472; F16J 15/4474; F01D 11/001; F01D 11/02; F01D 11/025; F01D 11/003; F01D 11/08; F05D 2240/55; F05D 2240/57; F02C 7/28

USPC ......... 277/347, 355, 409, 411, 412, 413, 414, 277/416, 422
See application file for complete search history.

(56) References Cited

U.S. PATENT DOCUMENTS

| | | | | |
|---|---|---|---|---|
| 2,245,281 | A | * | 6/1941 | Joseph Klopak ............. 277/419 |
| 2,600,991 | A | * | 6/1952 | Hargrove ...................... 277/416 |
| 4,545,586 | A | * | 10/1985 | von Pragenau ............... 277/414 |
| 4,927,326 | A | * | 5/1990 | von Pragenau ............ 415/170.1 |
| 4,979,755 | A | * | 12/1990 | Lebreton ....................... 277/303 |
| 5,088,889 | A | * | 2/1992 | Wolff ......................... 415/171.1 |
| 5,374,068 | A | * | 12/1994 | Jewett et al. .................. 277/303 |
| 5,540,447 | A | * | 7/1996 | Shultz et al. .................. 277/303 |
| 5,540,477 | A | | 7/1996 | Mori |

(Continued)

FOREIGN PATENT DOCUMENTS

GB           2128693 A      5/1984

OTHER PUBLICATIONS

U.S. Appl. No. 12/692,369, filed Jan. 22, 2010, Hrishikesh Vishvas Deo.

(Continued)

*Primary Examiner* — Kristina Fulton
*Assistant Examiner* — Nicholas L Foster
(74) *Attorney, Agent, or Firm* — Ann M. Agosti

(57) ABSTRACT

The present disclosure relates to a seal assembly for a turbomachine that includes at least one arcuate plate, a biasing member, and at least one packing ring segment. The packing ring segment includes at least one barrier that restricts circumferential flow of a fluid along the packing ring segment. In addition, the seal assembly includes a plurality of arcuate teeth disposed intermediate to the packing ring segment and the rotor. The clearances of at least two of the arcuate teeth are different from one another.

13 Claims, 4 Drawing Sheets

(56) References Cited

U.S. PATENT DOCUMENTS

| | | | |
|---|---|---|---|
| 5,599,026 A * | 2/1997 | Sanders et al. | 277/415 |
| 5,603,510 A * | 2/1997 | Sanders | 277/413 |
| 5,707,064 A * | 1/1998 | Vance | 415/174.5 |
| 5,794,942 A * | 8/1998 | Vance et al. | 277/303 |
| 6,250,641 B1 * | 6/2001 | Dinc et al. | 277/355 |
| 6,572,115 B1 * | 6/2003 | Sarshar et al. | 277/412 |
| 6,935,634 B2 * | 8/2005 | Zuo et al. | 277/409 |
| 7,004,475 B2 * | 2/2006 | McHale et al. | 277/411 |
| 7,216,871 B1 * | 5/2007 | Datta | 277/411 |
| 7,624,989 B2 * | 12/2009 | Hartmann et al. | 277/346 |
| 7,815,193 B2 * | 10/2010 | Feistel et al. | 277/303 |
| 7,971,882 B1 * | 7/2011 | Liang | 277/418 |
| 8,113,771 B2 * | 2/2012 | Turnquist et al. | 415/173.3 |
| 8,262,349 B2 * | 9/2012 | Turnquist et al. | 415/173.4 |
| 8,360,712 B2 * | 1/2013 | Deo et al. | 415/1 |
| 8,932,001 B2 * | 1/2015 | Zheng et al. | 415/1 |
| 2007/0296158 A1 * | 12/2007 | Datta | 277/411 |
| 2009/0297341 A1 * | 12/2009 | Turnquist et al. | 415/173.3 |
| 2010/0143102 A1 | 6/2010 | Deo et al. | |
| 2010/0158674 A1 * | 6/2010 | Turnquist et al. | 415/173.1 |
| 2011/0182719 A1 * | 7/2011 | Deo et al. | 415/173.1 |
| 2012/0003080 A1 * | 1/2012 | Deo et al. | 415/174.5 |
| 2012/0133101 A1 * | 5/2012 | Deo et al. | 277/416 |
| 2013/0001886 A1 * | 1/2013 | Roy et al. | 277/543 |
| 2013/0058766 A1 * | 3/2013 | Zheng et al. | 415/173.5 |

OTHER PUBLICATIONS

U.S. Appl. No. 12/827,513, filed Jun. 30, 2010, Hrishikesh Vishvas Deo.

U.S. Appl. No. 12/957,127, filed Nov. 30, 2010, Hrishikesh Vishvas Deo.

* cited by examiner

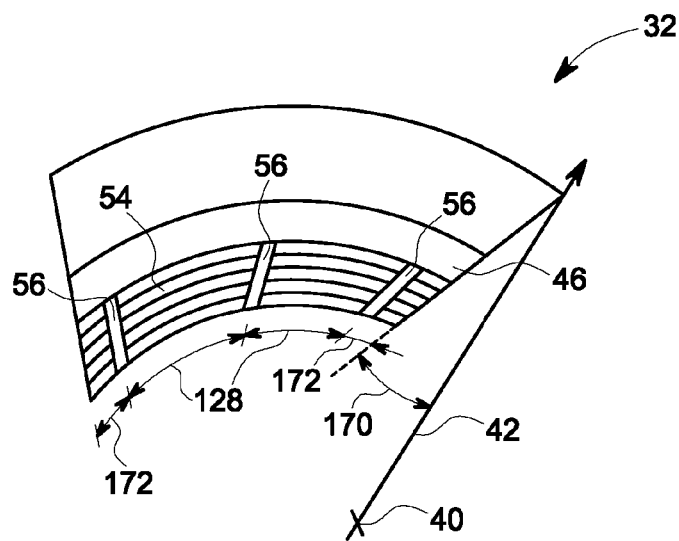
FIG. 9
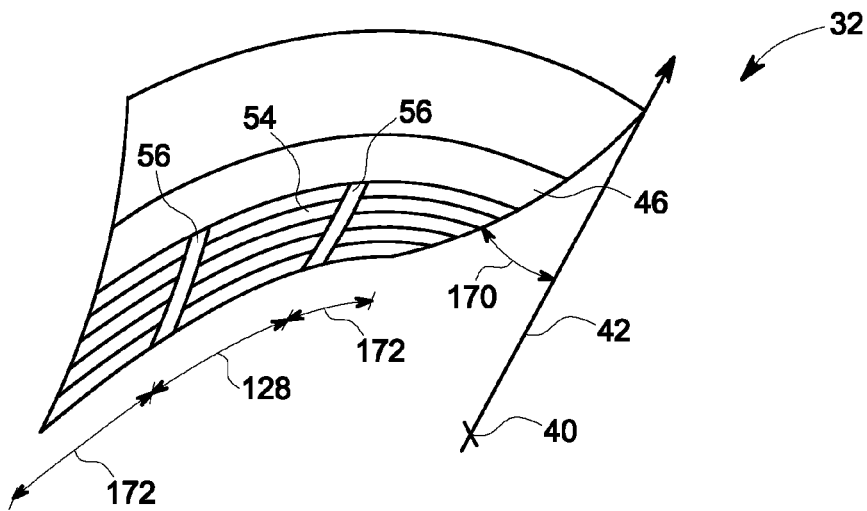
FIG. 10
FIG. 11

METHOD AND APPARATUS FOR LABYRINTH SEAL PACKING RING

BACKGROUND OF THE INVENTION

The subject matter disclosed herein relates to the field of seals used in turbomachinery. More particularly, the subject matter disclosed herein relates to a progressive clearance labyrinth seal for application at the interface of a rotating component, such as a rotor in a turbine or compressor, and a stationary component, such as a casing or stator.

Labyrinth seals used in gas turbines, steam turbines, aircraft engines, compressors, and other turbomachinery systems are susceptible to leakage because a rotor clearance may be configured to be large enough to help prevent the rotor from rubbing against the seal. If the rotor does contact the seal, which is referred to as rotor-rub, the seal may be damaged creating an even larger clearance thereafter. Specifically, rotor-rub may occur in a gas turbine during a number of rotor transients that may include rotor dynamic excitation, relative thermal distortion of the rotor and stator, or shift in the center of the rotor because of development of a hydrodynamic lubricating film in the journal bearings with increasing speed. Deflection may occur when a gas turbine passes through critical speeds, such as during start-up. Distortion may be caused by thermal discrepancies between different components within the gas turbine. A large clearance between the seal and rotor is needed because a labyrinth seal may be unable to adjust its clearance during the rotor transients as it may be rigidly coupled to the stator. The clearances between rotating and stationary components of gas turbines may affect both the efficiency and performance of the turbine. In the design of gas turbines, close tolerances between components may result in greater efficiency. Similar rotor transients occur in other turbomachinery systems such as steam turbines, aircraft engines, or compressors, and the transients may often be difficult to predict.

In addition, labyrinth seals may be configured with a Variable Clearance Positive Pressure Packing (VCPPP) ring that biases the labyrinth seal away from the rotor to a large clearance by means of a spring. This helps prevent a rotor-rub during start-up rotor transients. When the differential pressure across the seal builds up beyond a certain value, the forces on the VCPPP ring cause it to close to a small rotor clearance. In the VCPPP ring design, there exists a steam-seal joint where the VCPPP ring contacts the casing or stator. The friction at this joint may introduce a hysteresis in the opening and closing of the VCPPP ring. If there are rotor transients after the VCPPP ring has closed, there will be rotor-rubs and damage to labyrinth teeth.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a turbomachine includes a stationary housing and a rotor rotatable about an axis. The seal assembly for the turbomachine includes at least one arcuate plate coupled to an interior surface of the stationary housing and positioned in a radial plane. The seal assembly also includes at least one packing ring segment disposed intermediate to the rotor and the plate. The packing ring segment is positioned to move along the plate in a radial direction. The packing ring segment includes at least one barrier that restricts circumferential flow of a fluid along the packing ring segment. The seal assembly also includes a plurality of arcuate teeth disposed intermediate to the packing ring segment and the rotor. The clearances of at least two of the arcuate teeth are different from one another. In addition, the clearances of the arcuate teeth create a passive feedback in the hydrostatic forces generated by differential pressure across the seal assembly, such that as a tip clearance decreases, outward radial forces cause the packing ring segment to move away from the rotor and as the tip clearance increases, inward radial forces cause the packing ring segment to move toward the rotor. The seal assembly also includes a biasing member disposed intermediate to the arcuate plate and the packing ring segment and coupled to both.

In a second embodiment, a turbomachine includes a stationary housing and a rotor rotatable about an axis. A method of manufacturing a seal assembly for the turbomachine includes forming an arcuate packing ring segment. The arcuate packing ring segment is configured to be installed intermediate to the rotor and the stationary housing. The arcuate packing ring segment includes an inner surface and an outer surface. The arcuate packing ring segment includes at least one barrier and a plurality of arcuate teeth disposed on the inner surface. In addition, the clearances of at least two of the arcuate teeth are different from one another. The method also includes coupling a biasing member to the outer surface of the packing ring segment.

In a third embodiment, a segment of a circumferentially-segmented seal assembly is configured to be disposed intermediate to a rotor and a stationary housing. The segment includes an arcuate packing ring segment configured to be disposed intermediate to the rotor and the stationary housing. The segment also includes a plurality of arcuate teeth disposed intermediate to the packing ring and the rotor. The clearances of at least two of the arcuate teeth are different from one another. The segment also includes at least one barrier disposed on the arcuate packing ring segment. The barrier is substantially perpendicular to the plurality of arcuate teeth.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 is an elevational view of an upstream side of a seal assembly in accordance with an embodiment of the present disclosure;

FIG. 10 is an elevational view of an upstream side of a seal assembly in accordance with an embodiment of the present disclosure; and FIG. 11 is a flow chart of a process for manufacturing a seal assembly in accordance with an embodiment of the present disclosure.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
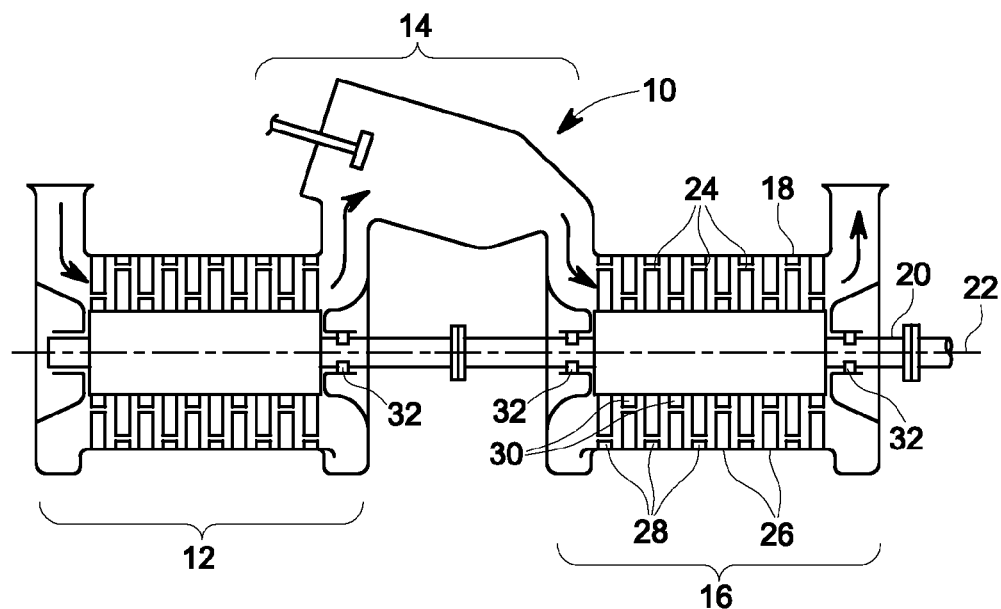
FIG. 1 is a cross-sectional view of a turbine system in accordance with an embodiment of the present disclosure.

FIG. 1 is a cross-sectional view of an embodiment of a turbine system 10, or turbomachine, which may include a variety of components, some of which are not shown for the sake of simplicity. In the illustrated embodiment, the gas turbine system 10 includes a compressor section 12, a combustor section 14, and a turbine section 16. The turbine section 16 includes a stationary housing 18 and a rotating element 20, or rotor, which rotates about an axis 22. Moving blades 24 are attached to the rotating element 20 and stationary blades 26 are attached to the stationary housing 18. The moving blades 24 and stationary blades 26 are arranged alternately in the axial direction. There are several possible locations where seal assemblies with barriers according to various embodiments may be installed, such as location 28 between a shrouded moving blade 24 and stationary housing 18, location 30 between the rotating element 20 and stationary blade 26, or an end-packing sealing location 32 between rotating element 20 and stationary housing 18.

Figure 2:
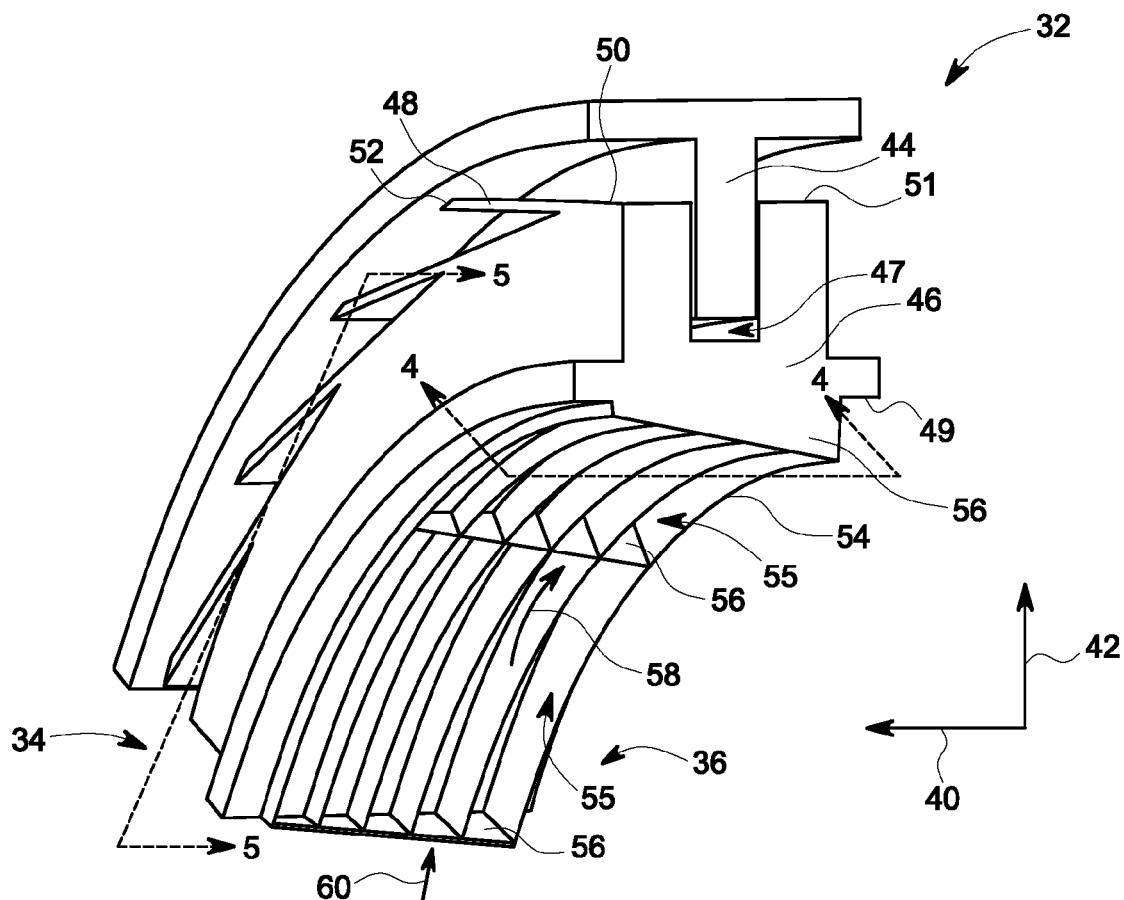
FIG. 2 is a perspective view of a sealing area of a turbine system, as shown in FIG. 1, having a seal assembly in accordance with an embodiment of the present disclosure.
Figure 3:
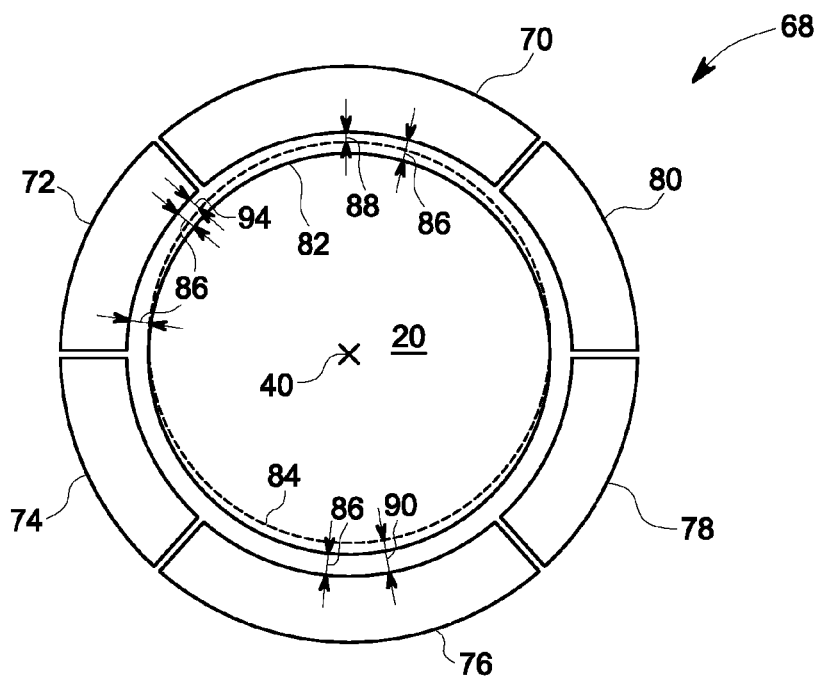
FIG. 3 is a cross sectional view along an axial axis of a typical seal assembly.

The seal assembly described herein includes one or more barriers that restrict circumferential flow of a fluid through the seal assembly. Specifically, by restricting circumferential flow, each segment of a multi-segment seal assembly is able to adjust individually to reduce axial leakage. The seal assembly described herein may be used with any suitable rotary machine, such as, but not limited to, the turbine system 10 of FIG. 1. FIG. 2 is a perspective view of an embodiment of the seal assembly 32. FIG. 3 illustrates how transients of the rotating element 20 may affect typical seal assemblies. FIGS. 4-10 are cross-sectional and elevational views of other embodiments of the seal assembly 32. FIG. 11 illustrates a process that may be used to manufacture embodiments of the seal assembly 32. In the illustrated embodiments, the barriers of the seal assembly 32 may reduce axial leakage between the rotating element 20 and the stationary housing 18. More specifically, in the embodiments described below, the rotating element 20 rotates relative to the stationary housing 18.

With the preceding in mind, FIG. 2 is a perspective view of an embodiment of the seal assembly 32 of the turbine system 10 of FIG. 1. Air, fuel, steam, or other gases enters the turbine system 10 at an upstream side 34 and exits the system at a downstream side 36. In the illustrated embodiment, the axial direction is indicated by axis 40 and the radial direction is indicated by axis 42. An arcuate plate 44 is coupled to the arcuate surface of the stationary housing 18 facing the rotating element 20. In certain embodiments, the plate 44 may be made from steel or steel alloys. Moreover, the cross-section of the plate may appear T-shaped in certain embodiments, as depicted in FIG. 2. The plate 44 may be rigidly attached to the housing 18. In addition, the plate 44 may be disposed as a complete 360-degree ring, as two 180-degree arcs, or smaller arcs that together form a complete ring. Further, in certain embodiments, the plate 44 may consist of a plurality of plates similarly configured.

An arcuate packing ring segment 46 is disposed intermediate to the plate 44 and the rotating element 20. One or more arcuate packing ring segments 46 may together form a complete ring. In other words, the seal assembly 32 may be referred to as circumferentially-segmented. The surface of the packing ring segment 46 facing the rotating element 20 may be referred to as an inner surface 49. Similarly, the surface of the packing ring segment 46 facing the stationary housing 18 may be referred to as an outer surface 51. In certain embodiments, the arcuate packing ring segment 46 may be made from steel or steel alloys. Moreover, the arcuate packing ring segment 46 is configured to mate with the plate 44, with a gap 47. Biasing members 48 are disposed intermediate to the stationary housing 18 and the arcuate packing ring segment 46. The biasing members 48 act as bearing flexures and provide a high stiffness in the axial direction 40 and a low stiffness in the radial direction 42. The high axial stiffness restricts significant motion in the axial direction. The low radial stiffness allows the arcuate packing ring segment 46 to move in the radial direction. In addition, the biasing member 48 supports the weight of the arcuate packing ring segment 46 and prevents it from touching the rotating element 20 under no-flow conditions. In certain embodiments, the biasing member 48 may consist of a plurality of flexures. A first end 50 of each flexure may be mechanically coupled to the arcuate packing ring segment 46 and a second end 52 of each flexure may be mechanically coupled to the stationary housing 18 or to the plate 44 when it is T-shaped. In certain embodiments, examples of mechanically coupling may include bolting, welding, or other suitable techniques for mechanically affixing two structures. In other embodiments, the first end 50 may be an integral part of the arcuate packing ring segment 46 and the second end 52 mechanically affixed to the housing 18. In yet another embodiment, the second end 52 may be an integral part of the stationary housing 18 or plate 44 when it is T-shaped, and the first end 50 mechanically affixed to the arcuate packing ring segment 46. In this embodiment, each flexure is shown as a cantilever with a large width to thickness aspect ratio. Other flexure designs are possible that also achieve a high axial stiffness and low radial stiffness.

The arcuate packing ring segment 46 further includes a plurality of arcuate teeth 54 coupled to the surface of the ring facing the rotating element 20. The segments of each tooth disposed on each segment of the packing ring segment 46 together form a complete ring around rotating element 20. The spaces, or gaps, between adjacent arcuate teeth 54 may be referred to as pockets 55. In certain embodiments, the teeth 54 may be made from a steel alloy. The teeth 54 may be arranged in one or more subsets of teeth. The clearance between the rotating element 20 and at least one of the teeth 54 is different from the clearances of the rest of the teeth 54. In other words, the clearances of all of the teeth 54 are not identical. For example, a packing ring segment 46 of six teeth 54 may include five identical clearances and one that differs. Further examples using six teeth 54 include four identical clearances and two that differ, three identical clearances and three that differ, two identical clearances and four that differ, and six clearances that all differ from each other.

For example, progressive clearance labyrinth seal assemblies may include one or more arcuate teeth 54 with decreasing clearances going from the upstream side 34 to the downstream side 36. Such seal assemblies may display self-correcting behavior when in operation. Specifically, when the clearances between tips of the arcuate teeth 54 and the rotating element 20 increase, hydrostatic lift-off forces decrease, thereby decreasing the clearances. When the clearances decrease, hydrostatic lift-off forces increase, thereby increasing the clearances. By maintaining the clearances, progressive clearance labyrinth seal assemblies help to reduce axial leakage and prevent turbine damage. Thus, progressive clearance labyrinth seal assemblies may use movement of arcuate packing ring segments 46 in a radial or circumferential direction to help maintain the desired tip clearances. Embodiments of the seal assembly 32 with barriers help to facilitate such movement in progressive clearance labyrinth seal assemblies and other seal assemblies that utilize packing ring movement, as described in further detail below.

As illustrated in FIG. 2, the arcuate packing ring segment 46 also includes one or more barriers 56 coupled to the surface of the ring facing the rotating element 20. The barriers 56 are configured to restrict circumferential flow of a fluid along the packing ring segment 46. For example, the barriers 56 may restrict circumferential flow of the fluid from one side of the packing ring segment 46 to another, as indicated by arrow 58. Further, the barriers 56 may restrict circumferential flow of the fluid from one packing ring segment 46 to another, as indicated by arrow 60. Thus, the barriers 56 help to restrict circumferential flow of the fluid in the channels between the arcuate teeth 54 of the packing ring segment 46. In the illustrated embodiment, the packing ring segment 46 includes three barriers 56, with two barriers 56 disposed near the ends of the packing ring segment 46 and one barrier 56 disposed near the middle of the packing ring segment 46, thereby dividing the packing ring segment 46 into two sectors. The three barriers 56 are configured to restrict both flow along the packing ring segment 46, as indicated by arrow 58, and flow from other packing ring segments 46, as indicated by arrow 60, as described in detail below. In other embodiments, more or fewer barriers 56 may be used to restrict circumferential flow along the packing ring segment 46 or between packing ring segments 46. For example, more barriers 56 may be used with larger packing ring segments 46 or to further restrict circumferential flow along the packing ring segment 46, as indicated by arrow 58. In further embodiments, the barriers 56 may be located a distance away from the ends of the packing ring segment 46, instead of being disposed at the ends of the packing ring segment 46. In the illustrated embodiment, the barriers 56 generally lie in an axial plane defined by the axial axis 40 and the radial axis 42 to restrict circumferential flow along the packing ring segment 46. In other words, the barriers 56 are substantially perpendicular to the arcuate teeth 54. However, in other embodiments, the barriers 56 may be configured at an angle away from the axial axis 40. In certain embodiments, the barriers 56 may be made from materials similar to those used for the packing ring segment 46 and/or arcuate teeth 54. For example, the barriers 56 may be made from a steel alloy.

To illustrate the relationship between transients of the rotating element 20 and circumferential flow, FIG. 3 is a cross sectional view along the axial axis 40 of a typical seal assembly 68. The seal assembly 68 includes six packing ring segments 70, 72, 74, 76, 78, and 80 disposed about the rotating element 20. Each of the packing ring segments 70, 72, 74, 76, 78, and 80 include arcuate teeth 54. Thus, the seal assembly 68 is a progressive clearance labyrinth seal assembly, as described above. A centered position 82 of the rotating element 20 may differ from an off-set position 84 of the rotating element 20. The difference between positions 82 and 84 may be caused by a variety of transients of the rotating element 20, such as, but not limited to, vibration, run-out, and thermal distortion. Thus, when the rotating element 20 is at speed, some of the packing ring segments 70, 72, 74, 76, 78, and 80 may be closer to the rotating element 20 than others.

For example, both packing ring segments 70 and 76 are separated from the rotating element 20 by a centered distance 86 when the rotating element 20 is in the centered position 82. In fact, all of the packing ring segments 70, 72, 74, 76, 78, and 80 may be separated from the rotating element 20 by the centered distance 86 when the rotating element 30 is in the centered position 82. However, when the rotating element 20 is in the off-set position 84, the separation between packing ring segment 70 and the rotating element 20 decreases to an off-set distance 88. Correspondingly, the separation between packing ring segment 76 and the rotating element 20 increases to an off-set distance 90. Thus, it would be expected that hydrostatic lift-off forces would increase for packing ring segment 70, thereby increasing the clearance between packing ring segment 70 and the rotating element 20. In addition, it would be expected that hydrostatic lift-off forces would decrease for packing ring segment 76, thereby decreasing the clearance between packing ring segment 76 and the rotating element 20. However, the pockets 55 between adjacent arcuate teeth 54 of packing ring segments 70, 72, 74, 76, 78, and 80 of the seal assembly 68 communicate with one another. In other words, circumferential flow may carry fluid from one packing ring segment to another and equalize the pressures in the corresponding pockets 55 for the different packing ring segments. Thus, the self-correcting hydrostatic forces discussed above may be rendered ineffective. When the rotating element 20 is in the off-set position 84, packing ring segment 76 may have increased axial leakage compared to packing ring segment 70. However, the barriers 56 disposed near the ends of the packing ring segment 46 shown in FIG. 2 restrict circumferential flow from adjacent packing ring segments 46, thereby enabling each of the packing ring segments 46 to respond individually to the hydrostatic lift-off forces. Thus, each of the packing ring segments 46 of the seal assembly 32 is able to maintain proper clearances during transients of the rotating element 20 to help reduce axial leakage.

Returning to FIG. 3, transients of the rotating element 20 and circumferential flow may also affect packing ring segments 72, 74, 78, and 80. Specifically, using packing ring segment 72 as an example, the clearance between the packing ring segment 72 and the rotating element 20 is the centered distance 86 when the rotating element 20 is in the centered position 82. However, when the rotating element 20 is in the off-set position 84, the clearance between the packing ring segment 72 and the rotating element 20 decreases at one end to an off-set distance 94. The separation between the other end of the packing ring segment 72 and the rotating element 20 remains at approximately the centered distance 86. Thus, where the separation has decreased to the off-set distance 94, hydrostatic lift-off forces would be expected to increase, thereby increasing the clearance between that end of the packing ring segment 72 and the rotating element 20. However, the pockets 55 between adjacent teeth 54 at one end of the packing ring segment 72 of the seal assembly 68 are in communication with the pockets 55 at the other end of the packing ring segment 72. In other words, fluid may flow circumferentially from one end to the packing ring segment 72 to the other end and equalize the pressures circumferentially along the pockets 55. Accordingly, the pressure along the packing ring segment 72 is approximately uniform. Thus, when the rotating element 20 is in the off-set position 84, one end of the packing ring segment 72 has a greater clearance than the other end, which may cause increased axial leakage. However, the barrier 56 disposed near the middle of the packing ring segment 46 shown in FIG. 2 restricts circumferential flow along the packing ring segment 46, thereby enabling each end of the packing ring segment 46 to respond relatively independently to the hydrostatic lift-off forces. Thus, the barriers 56 of the seal assembly 32 enable passive feedback and hydrostatic forces to maintain equilibrium clearances between the arcuate teeth 54 and the rotating element 20, such that the arcuate teeth 54 are prevented from contacting the rotating element 20 during transients of the rotating element 20, which also helps to reduce axial leakage.

Figure 4:
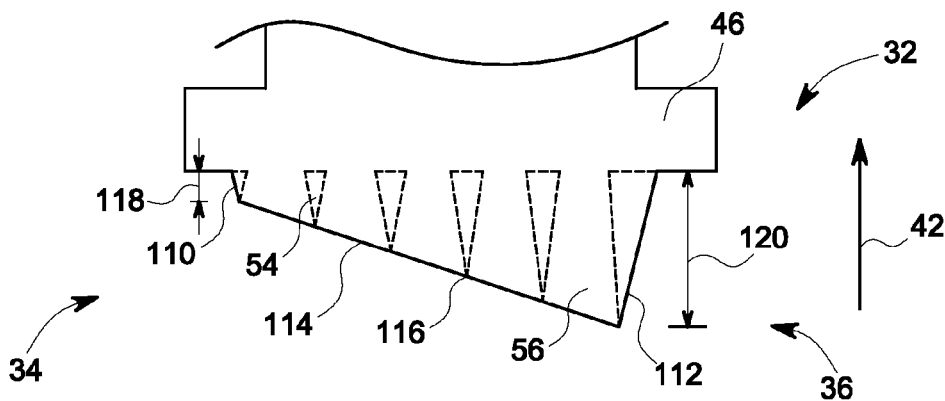
FIG. 4 is a cross sectional view of a seal assembly in accordance with an embodiment of the present disclosure.

Returning to the barrier 56 of the seal assembly 32 in more detail, FIG. 4 is a cross sectional view of an embodiment of the barrier 56 along the line labeled 4-4 in FIG. 2. As shown in FIG. 4, the lengths of the arcuate teeth 54 increase progressively moving from the upstream side 34 to the downstream side 36. An upstream side 110 of the barrier 56 generally follows the contour of the arcuate tooth 54 located at the upstream side 34. Similarly, a downstream side 112 of the barrier 56 generally follows the contour of the arcuate tooth 54 located at the downstream side 36. In other words, the upstream and downstream sides 110 and 112 are generally not parallel with the radial axis 42. A bottom side 114 connects the upstream and downstream sides 110 and 112 of the barrier 56. As shown in FIG. 4, the bottom side 114 generally follows the contour of the tips 116 of the arcuate teeth 54. Thus, the bottom side 114 slopes, such that an upstream height 118 of the barrier 56 is less than a downstream height 120. In other words, the barrier 56 has a generally trapezoidal shape. The configuration of the barrier 56 restricts circumferential flow of the fluid passing between the arcuate teeth 54 of the seal assembly 32. In other embodiments, the shape of the barrier 56 may be different from that shown in FIG. 4, as described in detail below.

Figure 5:
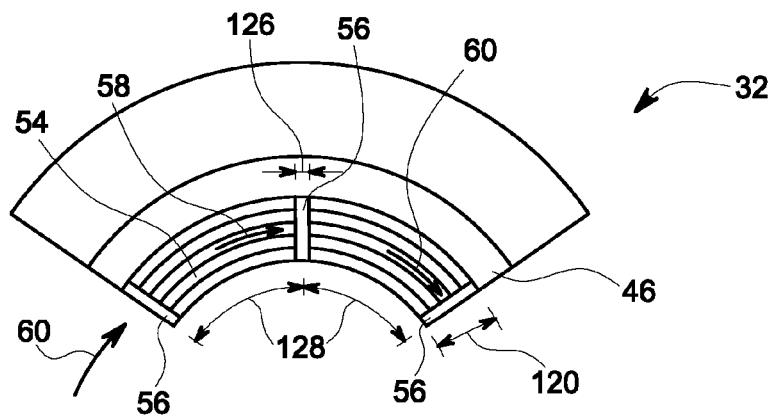
FIG. 5 is an elevational view of an upstream side of a seal assembly in accordance with an embodiment of the present disclosure.

To illustrate the structure of the barriers 56 from another view, FIG. 5 is an elevational view of the upstream side 34 of the seal assembly 32 along the line labeled 5-5 in FIG. 2. As shown in FIG. 5, the barriers 56 help to restrict circumferential flow of the fluid, as indicated by arrows 58 and 60. A thickness 126 of each of the barriers 56 may be configured to provide sufficient strength for the barriers 56 to restrict circumferential flow. In addition, the barriers 56 may be separated by a distance 128. In the illustrated embodiment, the seal assembly 32 includes three barriers 56 separated by approximately equal distances 128. In other embodiments, the seal assembly 32 may include additional barriers 56, which are also separated by approximately equal distances 128. In further embodiments, the separation distances 128 between the barriers 56 may be irregular or unequal.

Figure 6:
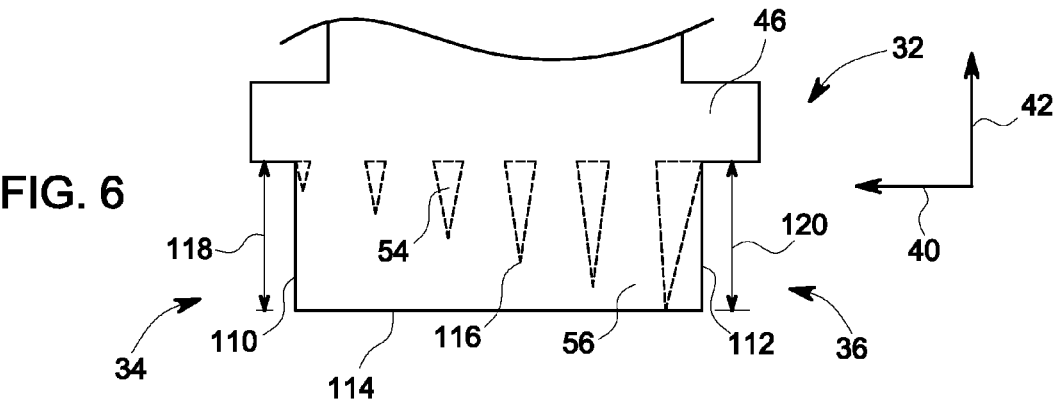
FIG. 6 is a cross sectional view of a seal assembly in accordance with an embodiment of the present disclosure.

The barriers 56 of the seal assembly 32 need not follow the contour of the tips 116 of the arcuate teeth 54. As illustrated in FIG. 6, the barrier 56 may have a generally rectangular shape. Specifically, the upstream side 110 may be generally parallel to the radial axis 42 and longer than the arcuate tooth 54 located at the upstream side 34. The downstream side 112 may also be parallel to the radial axis 42 and approximately the same length as the arcuate tooth 54 located at the downstream side 36. In other words, the upstream and downstream heights 118 and 120 of the barrier 56 may be approximately the same. Thus, the bottom side 114 may be generally parallel to the axial axis 40. In addition, the bottom side 114 of the barrier 56 may be generally straight. Such a configuration of the barrier 56 may further restrict circumferential flow compared to the barrier 56 shown in FIG. 4. That is, the barrier 56 shown in FIG. 6 not only restricts circumferential flow of the fluid between the arcuate teeth, but also substantially all the circumferential flow along the packing ring segment 46.

Figure 7:
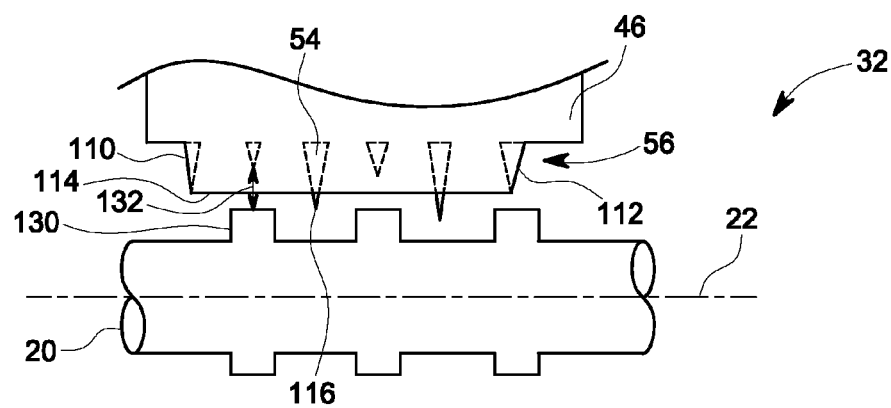
FIG. 7 is a cross sectional view of a seal assembly with raised lands on a rotating element in accordance with an embodiment of the present disclosure.

Barriers 56 may also be used in conjunction with seal assemblies 32 that include raised lands 130 on the rotating element 20, as illustrated in FIG. 7. Such "hi-lo" features may be useful in creating a more tortuous path for the leakage flow. In other words, clearances 132 between the arcuate teeth 54 and the raised lands 130 may progressively decrease moving from the upstream side 34 to the downstream side 36. In the illustrated embodiment, the upstream and downstream sides 110 and 112 of the barrier 56 generally follow the contours of the arcuate teeth 54 at the upstream and downstream sides 34 and 36. The bottom side 114 may be generally straight and spaced away from the raised lands 130 to help prevent the barrier 56 from running into the raised lands 130 during transients of the rotating element 20. In other embodiments, the bottom side 114 may have a generally sawtooth shape that follows the contour of the tips 116 of the arcuate teeth 54. In further embodiments, the bottom side 114 may have a generally square sawtooth shape that follows the contour of the raised lands 130. Thus, in certain embodiments, the bottom side 114 is not straight. Such configurations of the barrier 56 help to both restrict circumferential flow and accommodate the particular configurations of the seal assembly 32.

Figure 8:
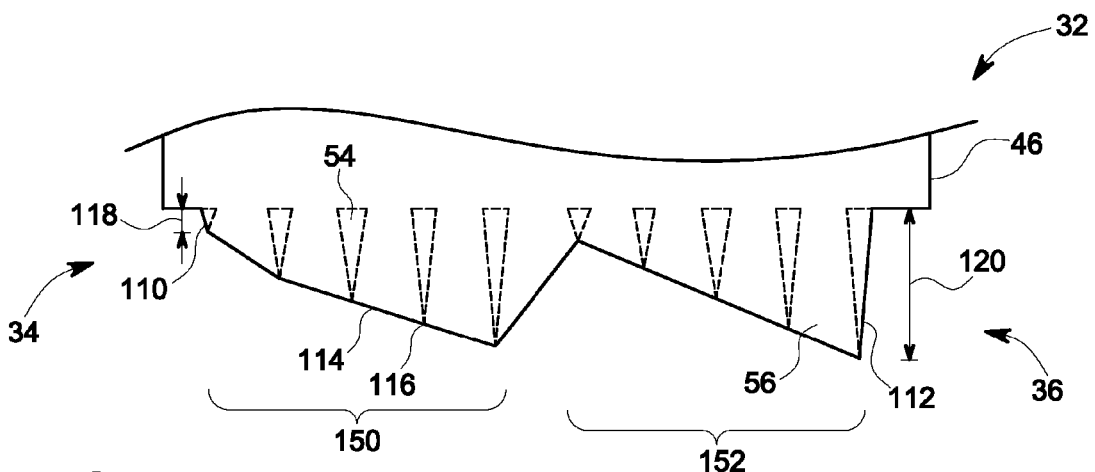
FIG. 8 is a cross sectional view of a seal assembly in accordance with an embodiment of the present disclosure.

In certain embodiment, the arcuate teeth 54 of the seal assembly 32 may be arranged in sets of repeating or non-repeating patterns, as illustrated in FIG. 8. Accordingly, the bottom side 114 of the barrier 56 may be configured to follow the contour of the tips 116 of the arcuate teeth 54. As shown in FIG. 8, a first portion 150 of the bottom side 114 may generally slope toward the rotating element 20 to follow the contour of the tips 116 of the first set of arcuate teeth 54. A second portion 152 of the bottom side 114 may follow the contour of the tips 116 of the second set of arcuate teeth 54. Thus, the bottom side 114 has a generally sawtooth shape and is not straight. In various embodiments, the barrier 56 may be configured with a variety of shapes to be generally compatible with different configurations of progressive clearance labyrinth seal assemblies 32.

In addition to the embodiments of the seal assemblies 32 discussed above, in certain embodiments, the sides of the packing ring segments 46 may be inclined at an angle 170 from the radial axis 42, as illustrated in the elevational view of FIG. 9. Such embodiments of the seal assembly 32 may enable the packing ring segments 46 to move both in radial and circumferential directions. In such embodiments, the barriers 56 may also be inclined at the angle 170 from the radial axis 42. Alternatively, the barriers 56 may be generally parallel to the radial axis 42. In the illustrated embodiment, the seal assembly 32 includes three barriers 56. The outer two barriers 56 are separated by approximately equal distances 172 from the edges of the seal assembly 32. In other embodiments, the two outer barriers 56 may be offset from the edges of the seal assembly 32 by unequal distances 172. In such embodiments, the separation distances 128 between the outer two barriers 56 and the inner barrier 56 may also be different.

In further embodiments, the edges of the seal assembly 32 may be arcuate, as illustrated in the elevational view of FIG. 10. Such embodiments of the seal assembly 32 may enable the packing ring segments 46 to move radially and circumferentially in a curved direction. In addition, the arcuate edges of the packing ring segment 46 may be inclined at the angle 170 from the radial axis 42. In such embodiments, the barriers 56 may also be arcuate. In the illustrated embodiment, the seal assembly 32 includes two barriers 56 separated from one another by the distance 128 and from the edges of the seal assembly by the distance 172. Both barriers 56 may help to restrict circumferential flow along the packing ring segment 46 and from other packing ring segments 46. In other respects, the seal assembly 32 shown in FIG. 10 is similar to other embodiments discussed in detail above.

The various embodiments of the seal assembly 32 discussed in detail above may be manufactured using a process 190, as illustrated in the flow chart of FIG. 11. In a step 192, the arcuate packing ring segment 46 of the seal assembly 32 is formed. The packing ring segment 46 is configured to be installed between the rotating element 20 and the stationary housing 18 of the turbine system 10. The packing ring segment 46 includes inner and outer surfaces 49 and 51. At least one barrier 56 and one or more arcuate teeth 54 are disposed on the inner surface 49 of the packing ring segment 46. The barrier 56 helps to restrict circumferential flow along the inner surface 49 of the packing ring segment 46. In addition, the clearance of at least one of the arcuate teeth 54 is different from the clearances of the rest of the arcuate teeth 54. In a step 194, a biasing member 48 is coupled to the outer surface 51 of the packing ring segment 46. The biasing members are configured to act as bearings and allow the packing ring segment 46 to move in a radial direction but restrict movement in an axial direction.

This written description uses examples to disclose the invention, including the best mode, and also to enable any person skilled in the art to practice the invention, including making and using any devices or systems and performing any incorporated methods. Further, the representative embodiments provided herein include features that may be combined with one another and with the features of other disclosed embodiments. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbomachine, the turbomachine comprising:
a stationary housing;
a rotor rotatable about an axis; and
a seal assembly, the seal assembly comprising:
at least one arcuate plate coupled to an interior surface of the stationary housing and positioned in a radial plane;
at least one packing ring segment disposed intermediate to the rotor and the plate, wherein the at least one packing ring segment comprises an upstream side and a downstream side and is positioned to move along the plate in a radial direction, and wherein the at least one packing ring segment comprises at least one inner barrier that is coupled to a surface of the at least one packing ring segment that faces rotor and that restricts circumferential flow of a fluid along the at least one packing ring segment;
a first plurality of arcuate teeth disposed intermediate to the at least one packing ring segment and the rotor, wherein a tip clearance between an innermost surface of one of the first plurality of arcuate teeth and a corresponding outer surface of the rotor is less than a like tip clearance for any of the other first plurality of arcuate teeth disposed upstream from the one of the first plurality of arcuate teeth, wherein at least two of the other first plurality of arcuate teeth are disposed upstream from the one of the first plurality of arcuate teeth and have different heights from each other, wherein the tip clearances associated with the one of the first plurality of arcuate teeth and the other first plurality of arcuate teeth disposed upstream from the one of the first plurality of arcuate teeth progressively decrease toward the downstream side of the at least one packing ring segment, and wherein the tip clearances of the first plurality of arcuate teeth create a passive feedback in the hydrostatic forces generated by differential pressure across the seal assembly, such that as the tip clearance decreases due to the hydrostatic forces outward radial forces cause the at least one packing ring segment to move away from the rotor, and as the tip clearance increases due to the hydrostatic forces inward radial forces cause the at least one packing ring segment to move toward the rotor; and
a biasing member disposed intermediate to the arcuate plate and the at least one packing ring segment and coupled to both.

2. The turbomachine of claim 1, wherein the at least one inner barrier is disposed at an end of the at least one packing ring segment.

3. The turbomachine of claim 1, wherein the at least one inner barrier is disposed toward an interior of the at least one packing ring segment.

4. The turbomachine of claim 1, wherein a pair of outer barriers is disposed near ends of the at least one packing ring segment and the at least one inner barrier is disposed toward an interior of the at least one packing ring segment.

5. The turbomachine of claim 1, wherein the at least one inner barrier comprises a metal plate connecting tips of the plurality of arcuate teeth.

6. The turbomachine of claim 1, wherein the at least one inner barrier is aligned with an inter-segment gap disposed between the at least one packing ring segment and an additional packing ring segment positioned adjacent the at least one packing ring segment.

7. The turbomachine of claim 1, wherein the at least one inner barrier is arcuate when viewed along the axis of the rotor.

8. The turbomachine of claim 1, wherein the passive feedback in hydrostatic forces maintains an equilibrium clearance between the plurality of arcuate teeth and the rotor, such that the plurality of arcuate teeth are prevented from contacting the rotor during rotor transients.

9. The turbomachine of claim 1, wherein the plurality of arcuate teeth are disposed on the at least one packing ring segment.

10. The turbomachine of claim 1, further comprising a second plurality of arcuate teeth, wherein tip clearances of the second plurality of arcuate teeth between an innermost surface of each of the second plurality of arcuate teeth and a corresponding outer surface of the rotor progressively decrease toward the downstream side of the at least one packing ring segment.

11. The turbomachine of claim 1, wherein a bottom side of the at least one inner barrier is sloped to follow a contour of the tips of the arcuate teeth.

12. The turbomachine of claim 1, wherein the biasing member is configured to act as a bearing and allow the packing ring segment to move in a radial direction but restrict movement in an axial direction.

13. The turbomachine of claim 1, wherein a pair of outer barriers is disposed at ends of the at least one packing ring segment, wherein the at least one inner barrier is disposed toward an interior of the at least one packing ring segment, and a bottom side of the at least one inner barrier is sloped to follow a contour of the tips of the arcuate teeth.

* * * * *